United States Patent
Ackland

[19]

[11] Patent Number: 6,010,558
[45] Date of Patent: Jan. 4, 2000

[54] GREASE CONTAINMENT SYSTEM AND METHOD FOR ABSORBING GREASE

[75] Inventor: Phillip Ackland, Summerland, Canada

[73] Assignee: Flame Gard, Inc., Calif.

[21] Appl. No.: 09/133,916

[22] Filed: Aug. 13, 1998

[51] Int. Cl.[7] .............................................. B01D 53/04
[52] U.S. Cl. ................... 95/141; 95/143; 96/131; 96/135; 96/136; 96/154; 55/515; 55/DIG. 36
[58] Field of Search ........................ 95/141, 143, 287; 96/108, 121, 131, 134–136, 153, 154; 55/512, 515, DIG. 36

[56] References Cited

U.S. PATENT DOCUMENTS

| | | | |
|---|---|---|---|
| 2,214,925 | 9/1940 | Guthrie | 96/134 |
| 2,623,607 | 12/1952 | Bottum | 96/134 X |
| 3,722,188 | 3/1973 | Cullen | 96/134 X |
| 3,990,872 | 11/1976 | Cullen | 55/515 X |
| 4,124,116 | 11/1978 | McCabe, Jr. | 96/108 |
| 4,235,220 | 11/1980 | Hepner | 96/136 X |
| 4,418,662 | 12/1983 | Engler et al. | 96/134 X |
| 4,506,655 | 3/1985 | Kuechler | 55/DIG. 36 |
| 4,701,195 | 10/1987 | Rosendall | 96/136 |
| 4,756,726 | 7/1988 | Peace | 55/515 X |
| 4,854,949 | 8/1989 | Giles, Sr. et al. | 55/DIG. 36 |
| 4,869,236 | 9/1989 | Blough | 55/DIG. 36 |
| 4,887,588 | 12/1989 | Rial | 126/299 R |
| 4,900,341 | 2/1990 | Csabai | 55/DIG. 36 |
| 4,913,942 | 4/1990 | Jick | 96/121 |
| 4,917,862 | 4/1990 | Kraw et al. | 96/134 X |
| 4,923,725 | 5/1990 | Zafiroglu | 428/36.4 |
| 4,977,634 | 12/1990 | Koji | 96/135 X |
| 5,037,557 | 8/1991 | Warrenchak et al. | 210/691 |
| 5,196,040 | 3/1993 | Malloy et al. | 55/323 |
| 5,266,090 | 11/1993 | Burnett | 96/135 X |
| 5,318,607 | 6/1994 | Malloy et al. | 55/323 |
| 5,354,365 | 10/1994 | Youn | 96/135 |
| 5,509,853 | 4/1996 | Wells | 454/370 |
| 5,512,073 | 4/1996 | Mirza et al. | 55/323 |
| 5,518,532 | 5/1996 | Oace | 96/134 |
| 5,518,797 | 5/1996 | Holland | 428/132 |
| 5,540,744 | 7/1996 | Renna | 55/323 |
| 5,567,216 | 10/1996 | Mirza et al. | 55/323 |
| 5,609,768 | 3/1997 | Mueller | 210/691 |
| 5,632,889 | 5/1997 | Tharp | 210/165 |
| 5,814,115 | 9/1998 | Allen et al. | 55/DIG. 36 |
| 5,837,039 | 11/1998 | LeConey et al. | 96/121 |
| 5,914,456 | 6/1999 | LeConey et al. | 96/121 |

OTHER PUBLICATIONS

"The Grease Hound" product brochure, 2 pages, undated.
"Grease Guard, Inc., Maintenance Program" product literature, 6 pages, undated.
"Shield Your Roof From Serious Problems With EGIS" product brochure, 6 pages, undated.
"XSORB Product Information", 6 pages, Apr. 1997.
"XSORB The Aqua Fend Filter For Urban Runoff", 5 pages, Apr. 1997.
"XSORB Material Safety Data Sheet", 1 page, Mar. 1997.

*Primary Examiner*—Robert H. Spitzer
*Attorney, Agent, or Firm*—Stephen Donovan

[57] ABSTRACT

A rooftop grease containment system for absorbing the high viscosity grease carried by the gaseous effluent generated by cooking food and released through a rooftop exhaust vent, comprising 4–8 mm hydrophobic silica particles contained within porous pads, tubes and pillows placed in different positions in proximity to the rooftop exhaust vent is disclosed.

20 Claims, 4 Drawing Sheets

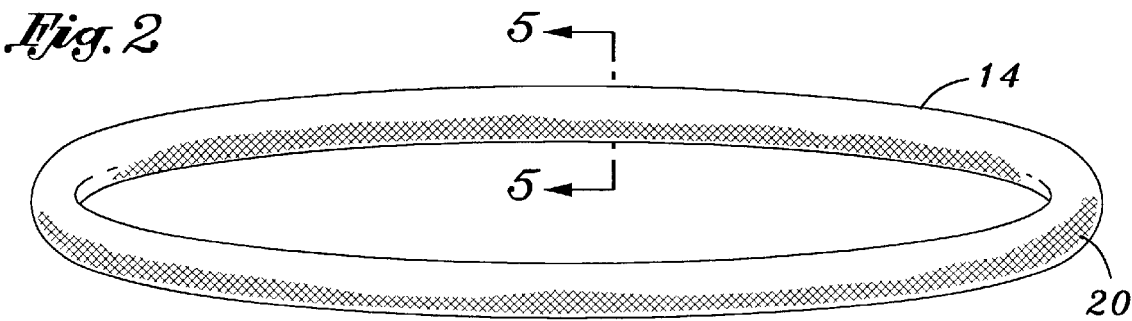
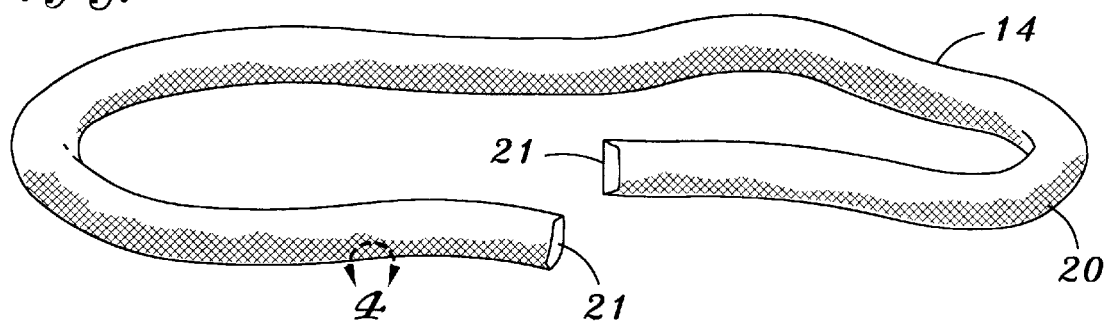
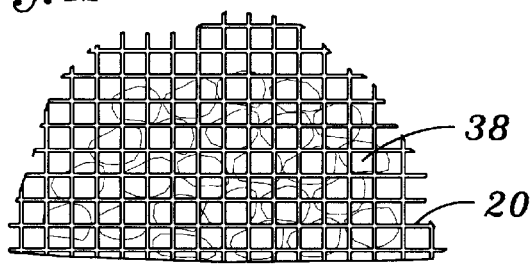
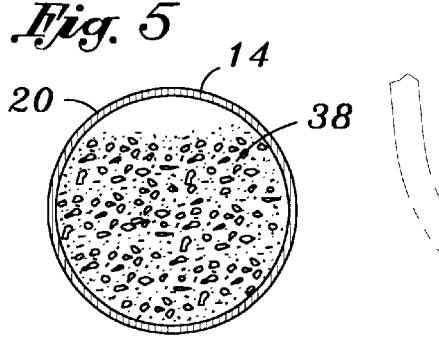
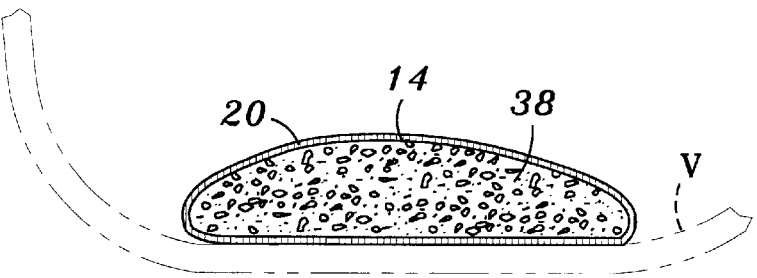

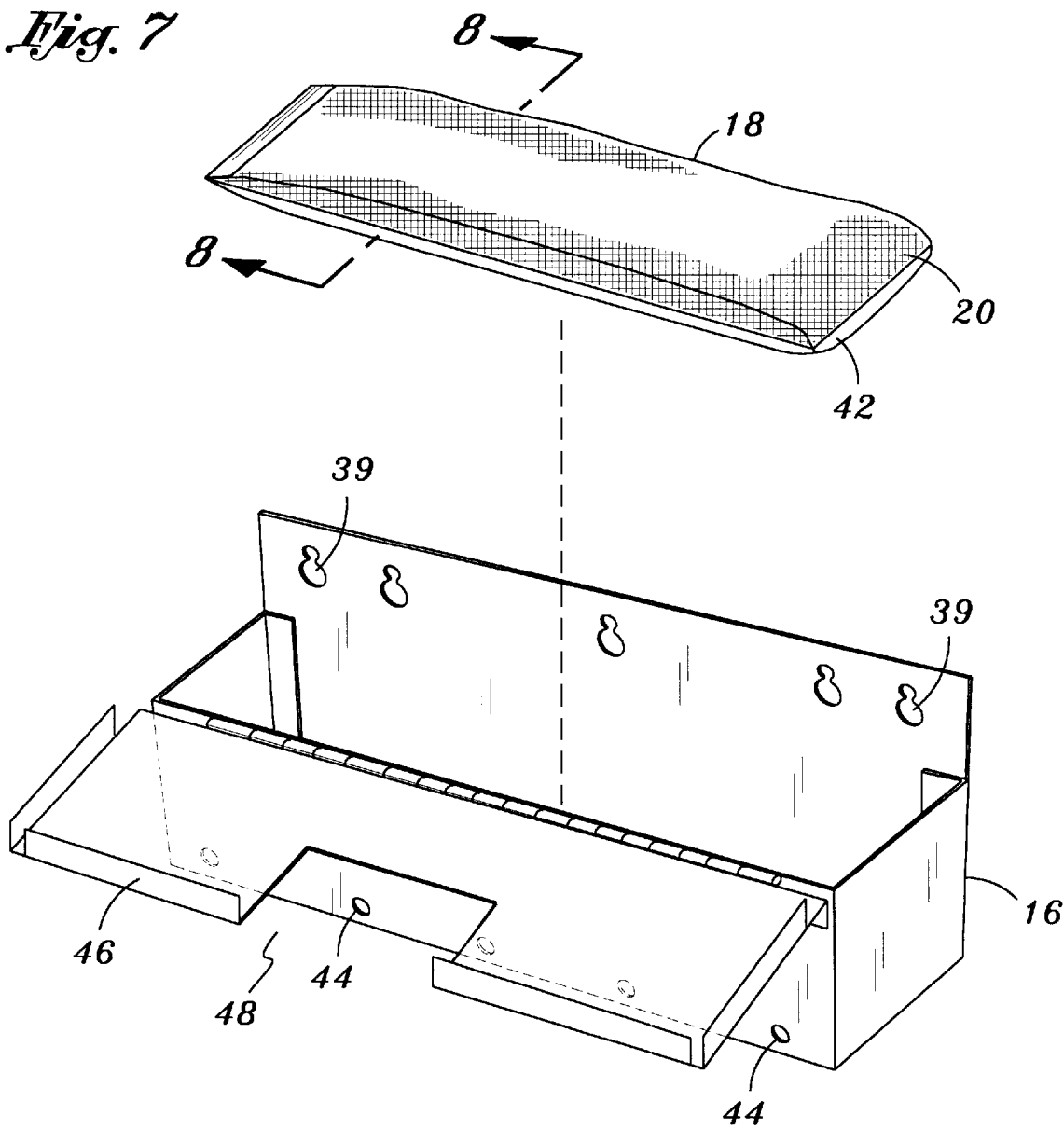
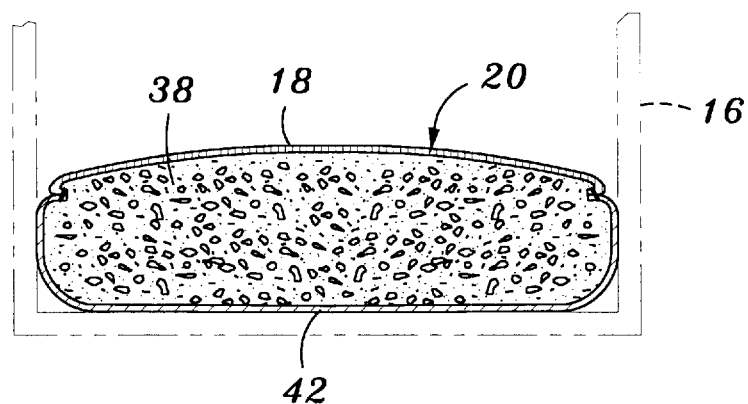

GREASE CONTAINMENT SYSTEM AND METHOD FOR ABSORBING GREASE

BACKGROUND

The present invention relates to a system and method for absorbing grease. In particular, the present invention relates to a system and method for absorbing and containing the grease vaporized or generated by cooking food and discharged from a rooftop exhaust vent.

Cooking food, in particular meat and meat products, can vaporize and/or generate various types of fat, oil and grease (referred to collectively as grease). Restaurants and fast food outlets can produce significant amounts of airborne and vaporized grease which is carried away from the vicinity of the stove, cooking range, grill or fryer by the kitchen exhaust system. The effluent gas and combustion products comprise the exhaust which is conducted by ducts to a rooftop exhaust vent or outlet where it is released into the atmosphere. The grease discharged with the exhaust from the exhaust vent can condense from the effluent exhaust gas and drip onto the rooftop adjacent to the exhaust vent. The vent can comprise a fan such as an upblast or blower type fan.

Deposits of grease on the roof can stain, damage and corrode the roof, appear unsightly, create unpleasant odors and prove a substrate for microbial germination. Additionally, accumulations of grease on the rooftop can create both a fire hazard due to the highly flammable nature of the grease and a safety hazard for those working on the roof due to the slippery nature of the grease. Furthermore, condensations of the grease on the exhaust vent at or near the position of the effluent exit from the exhaust vent can damage the vent and present a fire hazard.

Rooftop silica sand (such as heavy, crushed pumice rock) filled sand boxes for absorbing cooking grease released from restaurant rooftop vent effluent gases are known as disclosed by U.S. Pat. No. 4,887,588. Unfortunately, an absorbent silica sand or powder cannot be enclosed and used within an easily installed, removed and disposed of bag because making pores in the bag material small enough to retain the sand granules prevents the grease from permeating the bag and reaching the absorbent sand within the bag. And, as is well known, loose or unbagged sand is easily scattered. Additionally, a sand box type product being placed around the bottom of the exhaust vent cannot prevent the accumulation of grease in the vent or on the interior of the vent or fan.

Also known is the use of an open mesh fabric container enclosing polymeric particles for the absorption of cooking grease near rooftop exhaust ducts, as discussed by U.S. Pat. No. 4,923,725. Organic based polymeric products can be expensive to produce and can melt if placed on or in the exhaust vent, resulting in a dramatic reduction of surface area and concomitant loss of absorbency.

Both sand and polymeric particles can suffer adverse effects on their absorbency function from exposure to the elements, necessitating multilayer, difficult to access mechanical enclosures or plates which shelter the sand or particles while still permitting access by the grease to be absorbed. Sand or other granular material is particularly difficult to retain in a desired location and cannot be bagged in a material significantly permeable to high viscosity cooking grease.

What is needed therefore is a rooftop grease containment system which can absorb the grease at multiple locations in and around the exhaust vent where the system is economical, easy to maintain with no requirement for any tools or equipment and can be quickly installed and removed.

SUMMARY

The present invention meets this need and provides a rooftop grease containment system which can absorb the high viscosity cooking grease at multiple locations in and around a rooftop exhaust vent while providing a system that is economical, easy to maintain, has no requirement for any tools or equipment and can be quickly installed, modified and removed.

A rooftop grease containment system within the scope of the present invention includes at least one pad. Each pad has a porous upper surface, a nonporous lower surface, an attachment means for releasably attaching a pad to another pad, and grease absorbing particles enclosed within the pad between the upper and lower surfaces of the pad. The bottom of the pad can also have a retainment means for retaining the pad on a rooftop adjacent to a rooftop exhaust vent. Grease discharged from the exhaust vent condenses or drips onto the upper surface of the pad, passes through the pores and is absorbed and contained by the particles.

The pad is preferably divided by furrows into a plurality of adjacent, mutually aligned, substantially equal size pockets. Each pocket contains substantially the same amount of the particles and the furrows act to direct grease from one pocket as it becomes saturated with grease to an adjacent non-grease saturated pocket.

The grease containment system can also include a flexible and compressible tube formed from a porous material and removably placed around an exit for the effluent from the exhaust vent. The tube encloses the particles and can be used in other locations where grease needs to be absorbed, such as around a stove or fryer. The grease in the effluent passes through the pores and is absorbed by the particles.

The exhaust vent has a top, a bottom and a grease spout, and the grease containment system can further comprises a grease box securely attached near the bottom of the exhaust vent below the grease spout. The grease box has a bottom inside surface, and a pillow which comprises a porous upper surface, a nonporous lower surface, grease absorbing particles enclosed within the pillow between the upper and lower surfaces of the pillow and which is sized to cover substantially all of the bottom inside surface of the grease box is removably placed on the bottom inside surface of the grease box. Grease from the effluent passes down the grease spout into the grease box, through the pores and is absorbed and contained by the particles contained by the pillow.

The bottom of the pillow and a bottom of the pad is made of a nonporous, combustion resistant material impermeable to high viscosity cooking grease. Notably, the pores in the porous material are between about 1 mm to about 2 mm in diameter. The porous material can be a durable and lightweight meshwork of woven fiberglass threads.

The particles can comprise silica, be hydrophobic and can absorb at least about six grams of cooking oil per gram of particles. Additionally, the silica containing particles are substantially non-leaching, non-biodegradable, non toxic, inert, non-flammable, insoluble in water and have a high melting point. Furthermore, the silica particles are preferably expanded perlite treated with a silicone and comprise sodium potassium alumina silicate. The particles are between about 4 mm to about 8 mm in diameter and preferably the particles are between about 4 mm to about 6 mm in diameter.

The present invention also includes within its scope a kit for making the rooftop grease containment system. The kit can include: (a) a plurality of the pads to go on the rooftop next to the exhaust vent; (b) a flexible tube for removable placement around an exit for the effluent from the exhaust vent; (c) a grease box for attachment to the exhaust vent below a grease spout of the exhaust vent, and; (d) a pillow for placement in the grease box.

The present invention also includes within its scope a method for containing grease adjacent to a rooftop cooking gas exhaust vent, the method comprising the steps of placing a series of interlocked, porous pads on a rooftop in proximity to an exhaust vent, placing a porous, flexible tube around an exit for the effluent from the exhaust vent, (c) attaching a grease box near the bottom of the exhaust vent below a grease spout, and (d) placing a pillow sized to cover substantially all of a bottom inside surface of the grease box placed on the bottom inside surface of the grease box, wherein the pad, tube and pillow contain a grease absorbing substance comprising silica particles between about 4 mm and about 8 mm in diameter, a bottom of the pillow and a bottom of the pad comprise a nonporous, combustion resistant material and the pores in the pad, tube and pillow are between about 1 mm to 2 mm in diameter.

DRAWINGS

These and other features, aspects, and advantages of the present invention can become better understood from the following description, claims and the accompanying drawings where:

FIG. 2 is a perspective view of a first embodiment of the flexible tube shown in FIG. 1.

FIG. 3 is a perspective view of a second embodiment of the flexible tube shown in FIG. 1.

FIG. 4 is an enlarged view of the area in FIG. 3 bounded by the arrow 4 showing the grease absorbing material within the tube.

FIG. 5 is a cross sectional view taken along line 5—5 in FIG. 2.

FIG. 6 is the cross sectional view taken along line 5—5 in FIG. 2 showing the flexible tube in position against an inner exhaust fan wall illustrated in phantom.

FIG. 7 is an exploded, perspective view of a pillow being placed into a grease box.

FIG. 8 is cross sectional view taken along line 8–8 in FIG. 7 showing the pillow in position in the grease box.

DESCRIPTION

The present invention is based upon the discovery that significant amounts of the cooking grease discharged from a rooftop exhaust vent can be absorbed and contained by an inexpensive, easily installed and modified system comprising a variety of differently sized and shaped flexible open meshwork bags, containing highly grease absorbent particles, placed in, on and around the exhaust vent.

The disclosed grease containment system can absorb grease and fat from a rooftop kitchen exhaust vent before the grease drips onto the roof. The roof is thereby protected from grease induced staining and damage and can reduce the risk of a fire starting or being facilitated by grease present on the rooftop. The grease absorbing substance is a hydrophobic particulate material which locks the grease in. The grease is not leached out of the particles by rain or snow. The word grease as used herein includes fat and oils resulting from cooking, especially from cooking meat and meat products.

The grease absorbing material can covalently bond with and thereby retain the grease. The grease is not adsorbed by mere surface adhesion onto the nodules.

Figure 1:
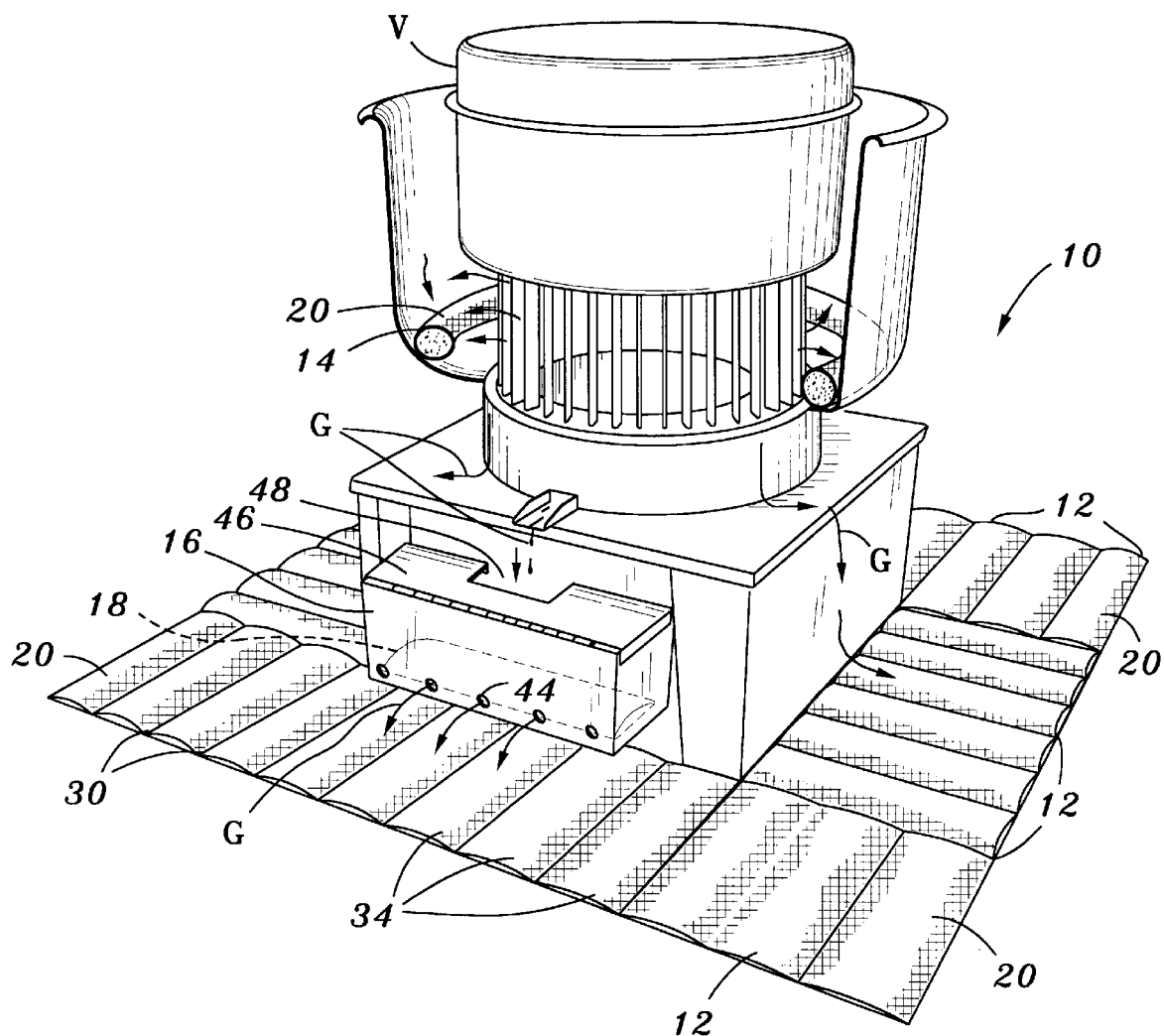
FIG. 1 is a cut away perspective view of an embodiment within the scope of the my grease containment system invention.

As shown by FIG. 1, a grease containment system 10 within the scope of the present invention can comprise a pad 12, a tube 14, a grease box 16 and a pillow 18. The exhaust vent V is not a part of the invention. The top of the pad 12, essentially all of the tube 14 and the top of the pillow 18 is made of a porous material 20 permeable to cooking grease G discharged from the vent V. The grease G has a high viscosity similar to that of honey or molasses.

Figure 9:
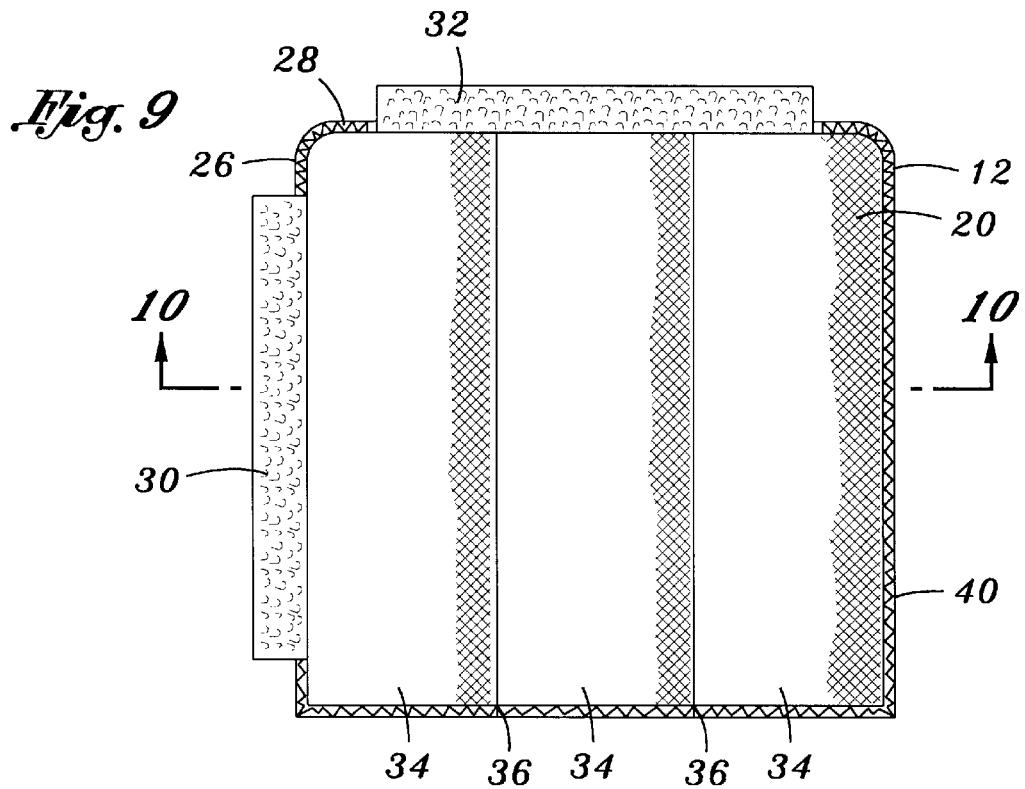
FIG. 9 is a plan or top view of the top of a pad.
Figure 10:
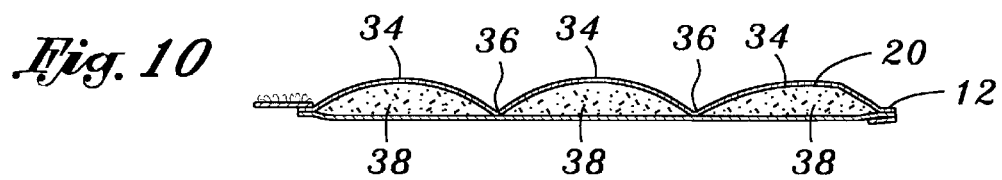
FIG. 10 is cross sectional view taken along the line 10—10 in FIG. 9.
Figure 11:
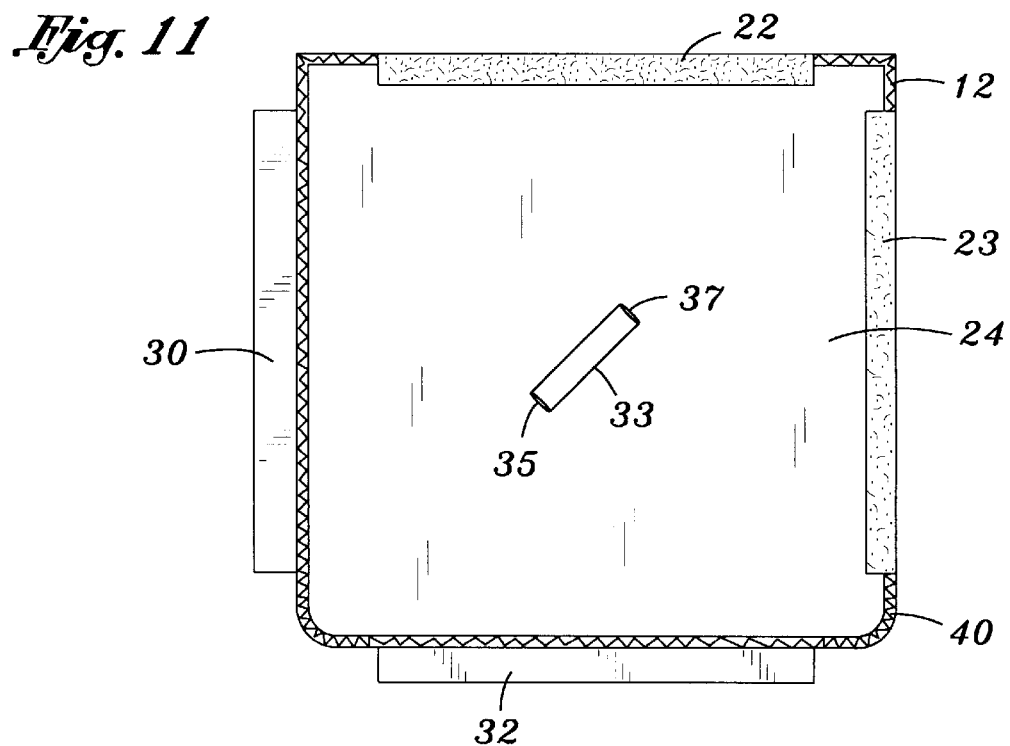
FIG. 11 is a bottom view of a pad.

The pad 12 is placed directly on the rooftop adjacent to the bottom of the exhaust vent V around the bottom of the exhaust vent. As illustrated by FIGS. 9 to 11, an attachment means comprising loop strips 22 and 23 and hook strips 30 and 32 (the hooks are shown in FIG. 9) on the bottom 24 of the pad permit the pad 12 to be attached to a plurality of other pads. The hook and loop strips can be made of a suitable material such as Velcro.

The bottom 24 of the pad 12 of a rubbery or vinyl non-slip material which tends to remain in contact with the roof. The pad bottom 24 does not bond to the roof thereby permitting easy removal of the pad from the roof surface and replacement by a new pad upon saturation of the pad with grease.

As shown by FIG. 11, the pad bottom 24 can also have a retainment means in the form of an open sheath 33 for retaining the pad on a rooftop adjacent to a rooftop exhaust vent. A metal bar (not shown) sized to fit into the sheath is inserted into one open end 35 of the sheath and out the other open end 37 of the sheath 33 and serves thereby as a weight attached to the pad 12 for holding the pad in place on the rooftop. The metal bar can have a length such that it can be sequentially inserted into the sheaths of several of the pads in a multipad sheet thereby weighing down and holding the sheet on the rooftop.

A strip of the porous material 20 is folded over so that the edges meet. The double layer of porous material 20 is then formed into a plurality of separate but adjoining porous bags 34 by running at least one stitch (or a heat seal or a glue sealant) down the length of the doubled over porous material in a straight line from one edge to the opposite edge of the two layer porous material. All but one side of the porous material is also sealed in the same manner. Through the one remaining open side of the porous material 20, the bags 34 are filled or partially filled with a grease absorbing particulates 38. Furrows 36 demark the line of separation between the filled intrapad bags 34.

The pad 12 is then formed by attaching the particulate filled porous material 20 to the pad bottom material 24. The attachment of porous material 20 to pad bottom material 24 can be accomplished by gluing, heat sealing or by sewing, as shown by threads 40.

The pad 12 is placed directly on a roof surface. The particulates 38 are hydrophobic and can absorb grease even if there is water on the pad. The pad 12 can be used singularly or in combination with one or more other pads. The pads 12 can be joined together into multipad sheets by use of retaining strips 30 located on at least two sides of each pad. In this manner, a number of pads can be joined together to contour them around and adjacent to an exhaust vent and individual pads can be easily removed and replaced.

The porous material 20 can be made by weaving a UV, weather and combustion resistant material such as 1 mm fiberglass thread at a density of between 12×12 to 20×20 threads per inch.

The pad bottom 24 must be a non porous solid material, such as a vinyl material which is also preferably fire resistant. A suitable material can be obtained from McCallister Mills, 173 Rainbow Circle, P.O. Box 590 Independence, Va. 24348 as silicone impregnated fiber glass cloth, style no. 3170. The pad bottom 24 prevents the absorption of roof tar or asphalt (found on the majority of restaurant roofs) by the silica particles within the pad. The absorption of roof tar and asphalt reduces the absorbent capacity of the silica particles for grease.

The present grease containment system can also include a tube 14, as shown by FIGS. 1 to 6. The tube is made out of the porous material 20. Before the tube is sealed it is partially filled with the particulates 38 as shown by FIG. 5. The particulate filled is flexible and is used by being wrapped around the circumference of the vent at the location where the grease carry effluent is discharged from the vent. Since the tube 14 is only partially filled with the particulates 38, the tube 14 can be pressed or flattened against the vent to increase the surface area exposed for grease absorption, as shown by FIG. 6. A preferred embodiment of the tube 14 (see FIG. 3) permits one or more tubes to be joined end to end to accommodate different gas vent circumferences. The tube is a tubular sock which is placed along the inside bottom of up-blast kitchen exhaust fan where it absorbs grease. Two or more tubes can be tied together to create a continuous absorbent barrier around the fan housing using adhesive strips 21 or ties on the end of the tubes.

The system can also include a grease box 16 as shown by FIGS. 1, 7 and 8. No tools or equipment except a drill and screw driver is required to quickly install the box on the vent through use of screws inserted through holes 39. A metal grease box is mounted on the side of the exhaust vent directly below the drip spout. A particle 38 filled pillow 20 is then placed in the grease box. When the pillow is saturated with grease it can be removed and replaced. A bottom 42 of the pillow is preferably made of a non-porous heat resistant material. The grease box 16 has water egress holes 44 to prevent an accumulation of water in the box 16. A hinged top 46 covers the box 16 while permitting grease to enter and fall on the pad 18 through cutout 48.

The grease absorbing particles 38 consist of nodules, particles or soft beads about 4 mm to about 8 mm in diameter. Particles larger than about 4 mm to about 8 mm have too little surface area to be used for 3–6 months before becoming saturated with grease. Smaller particles require a meshwork container in which the pores, while small enough to hold in the particles, are too small to admit the viscous grease to be absorbed. A higher surface area grease absorbing powder or sand is not used because the material used is placed within porous containers. The grease to be absorbed is a high viscosity grease with a viscosity similar to that of molasses or honey. Such a high viscosity grease cannot be absorbed through the fine meshwork, similar to that of a pillowcase, that would be required if a powder or sand was held within the containers. The pores must therefore be large enough to permit the grease to pass through to the grease absorbing material. The pores must also be smaller than the size of the particles so that the particles do no fall out of the container.

The particles 38 are used as nodules of a certain preferred size. If the nodules are too small they fall through the mesh. If the nodules are too large then they have less combined surface area resulting in less grease absorbency.

The particles 38 are enclosed by the porous material 20. The porous material is formed into meshwork bags with uniform size pores. If the pores are too large the particles 38 will fall out of their enclosures. If the pores are too small the grease G is excluded from significant permeation of the bags and therefore cannot be absorbed by the particles 38. At least one (bottom) side of pad 12 and pillow 18 is made of a combustion resistant, non-slip material which is not permeable to the grease.

The particles 38 used must be an absorbent, non-leaching, (so no leaching out of the grease), non-biodegradable (so that no deterioration of the material after long rooftop exposure to the elements and therefore no release of the grease absorbed) non toxic (so that it can be used without any particular safe handling instructions), inert (so that no toxins or chemical of any kind are released into the atmosphere as the material absorbing hot grease), easily disposed of, non-flammable (so that it will not assist combustion) nonstatic (so does it will not provide a static facilitated explosion) non-granular (so as not to facilitate a spontaneous combustion or ignition and inexpensive as compare to clay based products, non-carcinogenic and its use will not promote silicosis).

Preferably, the particles 38 can absorb at least twice their weight in cooking oil or grease. More preferably, the particles 38 used in this invention can absorb about four times their weight in cooking oil. Most preferably, the particles 38 can absorb about six times their weight in cooking oil. The ability to absorb six times their weight in cooking oil permits the particle containing pad 12, tube 14 and pillow 18 to be used in situ on the rooftop of a typical commercial restaurant for about six months before replacement of the grease saturated pads, tubes and pillows becomes necessary. It is also preferred that the particles 38 have a high melting point (i.e in excess of 2,000 degrees F.) so that they will not degrade while in use in proximity to a hot exhaust vent and is insoluble in water so that they will not be dissolved or washed away by precipitation falling on the rooftop.

Perlite (also called Pearlstone) is an unusual form of siliceous lava composed of small spherules about the size of small peas. The particles 38 used can be perlite particles which have been expanded and treated with a silicone to have the ability to selectively absorb hydrocarbons while being hydrophobic with regard to any water on or in which the hydrocarbons may be present.

The particles 38 can be an alumina silica sand which has been baked and treated. A suitable absorbent particulate material is available from Impact Absorbent Technologies, Inc., P.O. Box 1131 Atascadero, Calif. 93423 (Tel: 805 466 4709) as "XSORB Select Filter Beads." This product is the treated perlite discussed in U.S. Pat. No. 5,632,889.

EXAMPLES

Olive oil, and in a second test canola oil (both purchased off the shelf as domestic use products and used at room temperature), each weighing about 26.7 grams/fluid ounce, was dripped at a rate of about one drip per second onto a pillow 18 made of the porous material 20. The pillow 18 contained about 8 ounces (weight) of the XSORB Select Filter Beads obtained from Impact Absorbent Technologies, Inc..

The Beads were able to absorb all 50 fluid ounces (about 1,500 ml) of either the olive or canola oil used in this test. The absorbency of the Beads is therefore at least about 6.3 fl. oz. cooking oil/oz. of Beads or equivalently 169 grams cooking oil/oz of Beads or (since there are 28.3 grams/oz) 6 grams cooking oil/gram of Beads Additional tests (L test conducted without agitation [stagnant conditions] using a test cell filled with a weighed 80 mm layer of one of three test crude oils into which 4–10 grams of the Beads were placed into a fine mesh basket and lowered into the test cell and into the test oil used, remained in place for 15 minutes, drained and weighed) with oil determined (using an average of three separate test results for each type of oil tested) that the Beads can absorb an average 2.05 grams of diesel fuel (averaging 1.75, 1.86 and 2.53 results) with a density of 0.835 g/cubic cm and a viscosity of 1.8 centipoise (cP)/gram of Beads; an average 4.9 grams (averaging 4.92, 4.76 and 5.04 results) of mixed light oil (density 0.972, 155 cP)/gram of Beads, and; an average of 6.80 grams (averaging 6.34, 7.27 and 6.79 results) of heavy (Bachequero) crude oil (density 0.976, 4,100 cP)/gram of Beads.

A grease containment system according to the invention disclosed herein has many advantages, including the following:

1. Significant amounts of grease are absorbed from location in, on and adjacent to a rooftop exhaust vent.
2. The absorbent particles are contained within meshwork bags permeable to the high viscosity cooking grease.
3. The system is easy to install and to replenish with new grease absorbent material.

Although the present invention has been described in detail with regard to certain preferred methods, other embodiments, versions, and modifications within the scope of the present invention are possible. For example, a wide variety of grease absorbent containers beyond the pads, tubes and pillows disclosed herein are possible.

Accordingly, the spirit and scope of the following claims should not be limited to the descriptions of the preferred embodiments set forth above.

I claim:

1. A method for containing grease adjacent to a rooftop cooking gas exhaust vent, the method comprising the step of placing a plurality of interlocked, porous pads directly on a rooftop in proximity to an exhaust vent, the pads enclosing a grease absorbing substance comprising silica particles.

2. The method of claim 1, further comprising the step of placing a porous, flexible tube placed around an exit for the effluent from the exhaust vent, the tube containing a grease absorbing substance comprising the silica particles.

3. The method of claim 2, further comprising the steps of:
    (a) attaching a grease box attached near the bottom of the exhaust vent below a grease spout, and;
    (b) placing a pillow sized to cover substantially all of a bottom inside surface of the grease box placed on the bottom inside surface of the grease box, the pillow containing a grease absorbing substance comprising the silica particles.

4. A method for containing grease adjacent to a rooftop cooking gas exhaust vent, the method comprising the steps of:
    (a) placing a series of interlocked, porous pads on a rooftop in proximity to an exhaust vent;
    (b) placing a porous, flexible tube around an exit for the effluent from the exhaust vent;
    (c) attaching a grease box near the bottom of the exhaust vent below a grease spout, and;
    (d) placing a pillow sized to cover substantially all of a bottom inside surface of the grease box placed on the bottom inside surface of the grease box, wherein the pad, tube and pillow contain a grease absorbing substance comprising silica particles between about 4 mm and about 8 mm in diameter, a bottom of the pillow and a bottom of the pad comprise a nonporous, combustion resistant material and the pores in the pad, tube and pillow are between about 1 mm to 2 mm in diameter.

5. A rooftop grease containment system, comprising a pad having:
    (a) a porous upper surface;
    (b) a nonporous lower surface;
    (c) an attachment means for releasably attaching a pad to another pad, and;
    (d) grease absorbing particles enclosed within the pad between the upper and lower surfaces of the pad,
    whereby grease discharged from an exhaust vent condenses or drips onto the upper surface of the pad, passes through the pores and is absorbed and contained by the particles.

6. The grease containment system of claim 5, wherein the pad is divided by furrows into a plurality of adjacent, mutually aligned, substantially equal size pockets, each pocket containing substantially the same amount of the particles, the furrows acting to direct grease from one pocket as it becomes saturated with grease to an adjacent non-grease saturated pocket.

7. The grease containment system of claim 6 further comprising a flexible and compressible tube formed from a porous material and removably placed around an exit for the effluent from the exhaust vent, the tube enclosing additional grease absorbing particles whereby the grease in the effluent passes through the pores and is absorbed by the additional grease absorbing particles.

8. A. The grease containment system of claim 7, wherein the exhaust vent has a top, a bottom and a grease spout, and wherein the grease containment system further comprises a grease box securely attached near the bottom of the exhaust vent below the grease spout.

9. The grease containment system of claim 8, wherein the grease box has a bottom inside surface, and wherein the grease containment system further comprises a pillow, the pillow comprising:
    (a) a porous upper surface;
    (b) a nonporous lower surface;
    (c) grease absorbing particles enclosed within the pillow between the upper and lower surfaces of the pillow,
    the pillow sized to cover substantially all of the bottom inside surface of the grease box and removably placed on the bottom inside surface of the grease box, whereby the grease from the effluent passes down the grease spout into the grease box, through the pores and is absorbed and contained by the particles.

10. The grease containment system of claim 9, wherein a bottom of the pillow and a bottom of the pad comprises a nonporous, combustion resistant material impermeable to high viscosity cooking grease.

11. The grease containment system of claim 10, wherein the pores in the porous material are between about 1 mm to about 2 mm in diameter.

12. The grease containment system of claim 11, wherein the particles are between about 4 mm to about 8 mm in diameter.

13. The grease containment system of claim 12, wherein the particles are between about 4 mm to about 6 mm in diameter.

14. The grease containment system of claim 13, wherein the particles comprise silica, are hydrophobic and can absorb at least about six grams of cooking oil per gram of particles.

15. The grease containment system of claim 14, wherein the silica containing particles are substantially non-leaching, non-biodegradable, non toxic, inert, non-flammable, insoluble in water and have a high melting point.

16. The grease containment system of claim 15, wherein the silica particles comprise expanded perlite treated with a silicone.

17. The grease containment system of claim 16, wherein the silica particles comprise sodium potassium alumina silicate.

18. The grease containment system of claim 17, wherein the porous material comprises a durable and lightweight meshwork of woven fiberglass threads.

19. A rooftop grease containment system for absorbing grease discharged from a rooftop exhaust vent, comprising:
- (a) a plurality of pads releasably attachable to each other and removably placed directly onto a rooftop adjacent to a rooftop exhaust vent, each pad comprising;
  - (i) a porous upper surface made of a porous material comprising a meshwork of pores, each pore being between about 1 mm to about 2 mm in diameter;
  - (ii) a nonporous lower surface comprising a nonporous, combustion resistant material impermeable to high viscosity cooking grease;
  - (iii) an attachment means for releasably attaching a plurality of the pads to one another;
  - (iv) a retainment means for retaining the pad on a rooftop adjacent to a rooftop exhaust vent; and,
  - (v) a grease absorbing substance comprising silica particles which are between about 4 mm to about 8 mm in diameter, the silica particles being enclosed within the pad between the upper and lower surfaces of the pad,
- (b) a flexible tube for removable placement around an exit for the effluent from the exhaust vent, the tube being formed substantially from the porous material and the tube enclosing the silica particles;
- (c) a grease box for attachment to the exhaust vent below a grease spout of the exhaust vent, and;
- (d) a pillow for placement in the grease box, the pillow comprising,
  - (i) a porous upper surface made of a porous material comprising a meshwork; of pores, each pore being between about 1 mm to about 2 mm in diameter;
  - (ii) a nonporous lower surface comprising a combustion resistant material impermeable to high viscosity cooking grease;
  - (iii) a grease absorbing substance comprising silica particles which are between about 4 mm to about 8 mm in diameter, the silica particles being enclosed within the pillow between the upper and lower surfaces of the pillow.

20. The system of claim 19 wherein the silica particles are substantially non-leaching, non-biodegradable, non toxic, inert, non-flammable, insoluble in water and have a high melting point.

* * * * *